US007292180B2

(12) United States Patent
Schober (10) Patent No.: US 7,292,180 B2
(45) Date of Patent: Nov. 6, 2007

(54) SYSTEM AND METHOD FOR PASSIVELY ESTIMATING ANGLE AND RANGE OF A SOURCE USING SIGNAL SAMPLES COLLECTED SIMULTANEOUSLY FROM A MULTI-APERTURE ANTENNA

(75) Inventor: Michael B. Schober, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 158 days.

(21) Appl. No.: 11/152,291

(22) Filed: Jun. 13, 2005

(65) Prior Publication Data

US 2006/0279454 A1 Dec. 14, 2006

(51) Int. Cl.
*G01S 13/42* (2006.01)
(52) U.S. Cl. .................. 342/146; 342/29; 342/36; 342/68; 342/165; 342/173; 342/195
(58) Field of Classification Search ............... 342/146, 342/149, 152, 156, 27, 29–40, 68, 70, 165, 342/173, 174, 195
See application file for complete search history.

(56) References Cited

U.S. PATENT DOCUMENTS

| 3,935,574 | A | * | 1/1976 | Pentheroudakis | 342/424 |
| 4,734,702 | A | * | 3/1988 | Kaplan | 342/424 |
| 5,343,212 | A | * | 8/1994 | Rose et al. | 342/424 |
| 5,457,466 | A | * | 10/1995 | Rose | 342/442 |
| 5,526,001 | A | * | 6/1996 | Rose et al. | 342/442 |
| 5,870,056 | A | * | 2/1999 | Fowler | 342/424 |
| 6,255,992 | B1 | * | 7/2001 | Madden | 342/424 |
| 6,580,392 | B2 | * | 6/2003 | Yu | 342/378 |
| 6,903,685 | B1 | * | 6/2005 | Arndt et al. | 342/465 |
| 7,038,611 | B2 | * | 5/2006 | Gounalis | 342/13 |
| 2006/0279454 | A1 | * | 12/2006 | Schober | 342/146 |

FOREIGN PATENT DOCUMENTS

EP 747723 A2 * 12/1996
JP 10031067 A * 2/1998

OTHER PUBLICATIONS

"Passive source localization from spatially correlated angle-of-arrival data", Engelbrecht, R.Acoustics, Speech, and Signal Processing [see also IEEE Transactions on Signal Processing], IEEE Trans on vol. 31, Issue 4, Aug. 1983 pp. 842-846.*

(Continued)

*Primary Examiner*—John B Sotomayor
(74) *Attorney, Agent, or Firm*—Schwegman, Lundberg & Woessner, P.A.; Gregory J. Gorrie (57) ABSTRACT

A system and method for passively estimating range and angle of a source are disclosed. The source may be any wave source including radio-frequency (RF), optical, acoustic or seismic sources. In some RF embodiments, the system includes a single aperture antenna to simultaneously receive RF signals from the RF source through a plurality of sub-apertures, and a signal processor to perform a proximity test using samples simultaneously collected from the sub-apertures to determine whether or not to calculate angle and range estimates to the source based on either a curved wavefront assumption or a planar wavefront assumption.

32 Claims, 7 Drawing Sheets

OTHER PUBLICATIONS

A Linear Prediction-Like Algorithm for Passive Locationization of Near-Field Sources—(ISSPA), vol. 2 Aug. 25, 1998) vol. 2 XP010241088.

Second-Order Near Field Source Locaitonzation: Algorithm and Performance Analysis: Signals, Systems and Computers, 1996 Conference, Nov. 3, 1996) XP010231523.

A Weighted Linear Prediction Method for Near-Field Source Localization, 2002 IEEE International Conference on Acoustics, Speech and Signal Processing Proceedings May 13, 2002).

* cited by examiner

SYSTEM AND METHOD FOR PASSIVELY ESTIMATING ANGLE AND RANGE OF A SOURCE USING SIGNAL SAMPLES COLLECTED SIMULTANEOUSLY FROM A MULTI-APERTURE ANTENNA

TECHNICAL FIELD

Embodiments of the present invention pertain to determining a location of a signal source. Some embodiments pertain to tracking systems. Some embodiments pertain to passive range estimating.

BACKGROUND

Conventional techniques to determine the range of a source in the far-field of an antenna generally require a large number of samples taken over time. Furthermore, these conventional techniques use complex algorithms that require significant processing resources and energy. This makes it difficult to quickly and efficiently determine the range of a source using passive techniques. In some applications, quick, accurate and efficient techniques to determine range are desirable. Examples of these applications include air-traffic control (ATC), collision avoidance, missile fusing and target detection.

Thus, there are general needs for a system and method for passively estimating angle and range of a source using less signal samples. There are also general needs for a system and method for passively estimating angle and range of a source that requires fewer computations. There are also general needs for a system and method for passively estimating angle and range of a source that can extend range estimation beyond the Fresnel region into the antenna's far-field.

SUMMARY

A system and method for passively estimating range and angle of a source are disclosed. The source may be any wave source such as a radio-frequency (RF), optical, acoustic or seismic source. In some RF embodiments, the system includes a single aperture antenna to simultaneously receive RF signals from an RF source through a plurality of sub-apertures, and a signal processor to perform a proximity test using a single set of samples simultaneously collected from the sub-apertures to determine whether or not to calculate angle and range estimates to the source based on either a curved wavefront assumption or a planar wavefront assumption.

In some embodiments, the proximity test includes calculating a sum of mean-square-errors (MSEs) of angle and range estimates to the source based on a curved wavefront assumption using the measured phases from each sub-aperture, and calculating a sum of the MSEs of an angle estimate to the source based on a planar wavefront assumption using the measured phases from each sub-aperture. The proximity test also includes calculating a ratio of the sum of the MSEs calculated for the curved wavefront assumption to the sum of the MSEs calculated for the planar wavefront assumption. When the ratio exceeds a predetermined threshold, both angle and range estimates to the RF source may be calculated using the same initially collected samples used for the proximity test.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

In some radio-frequency (RF) embodiments, the present invention provides a system and method for passively estimating angle and range of a RF source using signal samples collected simultaneously from a single multi-aperture antenna. In some embodiments, the present invention provides a system and method for passively estimating angle and range of a source that requires fewer computations than conventional systems and methods. In some embodiments, the system and method of the present invention may test the arriving wavefront to determine if it is worthwhile to perform range estimation. A system and method for passively estimating angle and range of a source is also provided that may first test for near proximity to determine whether to perform range estimation. In some embodiments, the present invention may be able to extend range estimation beyond the Fresnel region into the far-field of a receive antenna.

Figure 1:
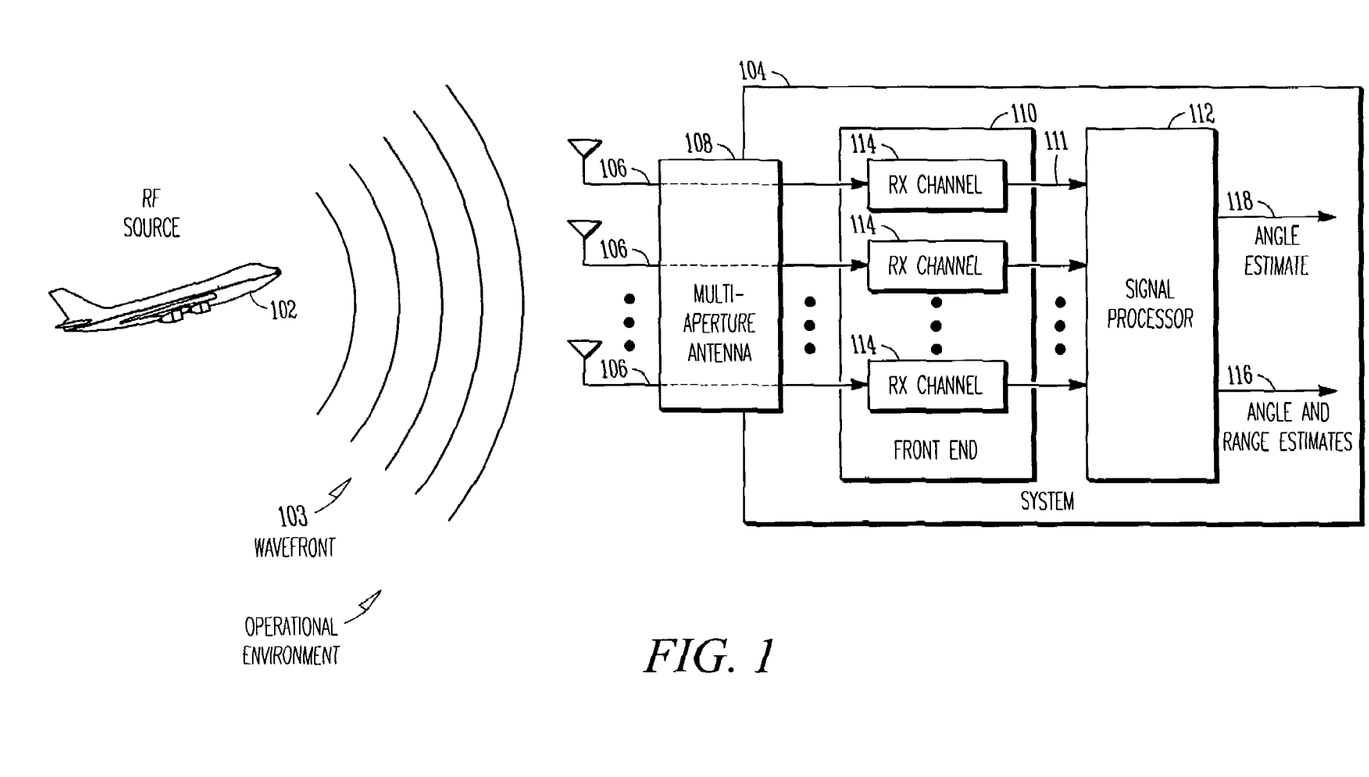
FIG. 1 illustrates an operational environment of an angle and range estimating system in accordance with embodiments of the present invention.

FIG. 1 illustrates an operational environment of an angle and range estimating system in accordance with embodiments of the present invention. Operational environment 100 includes source 102 which may emit signals 103 and angle and range estimating system 104 to estimate an angle and range to source 102. As used herein, the term passively may mean that system 104 may determine the angle and range to a signal source without the transmission of signals, such as radar signals, by system 104.

Angle and range estimating system 104 may include antenna 108 to receive signals 103 from source 102. The aperture of antenna 108 may be divided into three or more sub-apertures. Each sub-aperture may have one or more antenna elements 106. Angle and range estimating system 104 may also include front-end circuitry 110 to process the signals received by antenna 108 and generate digital samples 111. In some embodiments, each sub-aperture may be associated with a single receiver channel, each comprising receiver-channel circuitry 114. In these embodiments, each receiver channel may generate a set of samples 111 from signals received through one of the sub-apertures. Angle and range estimating system 104 may also include signal processor 112 to generate either angle and range estimates 116 or angle estimates 118 from samples 111. In some embodiments, samples 111 may include in-phase (I) and quadrature phase (Q) samples for signals 103 simultaneously received through each aperture, although the scope of the invention is not limited in this respect.

Angle and range estimating system 104 may passively estimate either the angle to Source 102 or both the angle and range to Source 102 depending on the result of a proximity test performed by system 104. In some embodiments, the proximity test may be performed by signal processor 112 to determine if source 102 is sufficiently close to antenna 108. In these embodiments, system 104 may use a simplified method to calculate the angle and range to source 102 when the proximity test indicates that the source is sufficiently close. In these embodiments, system 104 may calculate angle and range estimates to source 102 using the same simultaneous set of samples 111 of the signals that were used for the proximity test. In these embodiments, system 104 may determine range estimates of source 102 into the far-field of antenna 108, although the scope of the invention is not limited in this respect.

In some embodiments, when the proximity test indicates that the source is not sufficiently close to antenna 108, only angle estimate 118 to Source 102 may be determined using the same simultaneous sets of samples 111 because an accurate range estimate may be difficult to determine. In these situations, range estimates may be performed by conventional techniques not discussed herein.

In some radio-frequency (RF) embodiments, source 102 may be any device that emits RF energy and may include commercial and military aircraft, missiles, radar systems, ground vehicles and ground equipment, among other things. Source 102 may emit almost any type of RF signal including either pulsed waveforms or continuous-wave (CW) waveforms. The frequency of Source 102 may range from as low as a few kHz to as high as millimeter-wave frequencies and even greater. Antenna 108 and front-end circuitry 110 may be designed to receive a predetermined range of frequencies and may include front-end filtering to selectively receive frequencies within the predetermined range.

In some embodiments, signal processor 112 may determine the angle to Source 102 using a passive mono-pulse technique by using two or more receiver channels to simultaneously compare angle and phase of the received signals. In some embodiments, signal processor 112 may exploit the curvature of the wavefront arriving across the receiving aperture of antenna 108. The curvature may be determined using three or more sub-apertures for sampling. Each sub-aperture may include one or more antenna elements 106 of an array of elements to receive signals 103. In some embodiments, signal processor 112 may use a Fresnel approximation in its derivation since it may be extremely accurate over the region of interest. This approximation may be used to calculate the difference in range from source 102 to each array location relative to the center of the array. The Fresnel approximation is shown in the following equation.

$$D_x = d*\sin(\text{theta}) + (d*\cos(\text{theta}))^2/(2R) \quad (1)$$

where $D_x$ is the extra distance traveled between each array element, d is the distance from the center of the aperture to the array element location, theta is the angle of arrival (i.e., zero being broadside to the array), and R is the distance from the center of the aperture to the source. The first term in the expression represents the planewave assumption and the second term represents the additional distance caused by the wavefront curvature. The second term approaches zero as the range to the source increases.

Using the approximation of equation (1), a least mean-squared (LMS) formulation may be determined to estimate both the angle and range to the source. In embodiments in which the elements of antenna 108 comprise a linear array, the formulation becomes:

$$S = \Sigma(m_i - x_i Z - \tfrac{1}{2} W x_i^2 (1 - Z^2))^2 \quad (2)$$

In equation (2), $Z = \sin(\text{theta})$, $W = 1/R$, $x_i$=ith array location, $m_i$=ith array measurement, and S represents the sum of mean-squared-error (MSE) that is to be minimized. By solving for the minimum, the following estimates of Z and W may result.

$$Z\_\text{est} = (a*f - c*d)/(b*f - c*e) \text{ and } W\_ = (a - b*Z\_\text{est})/(c*(1 - Z\_\text{est}^2))$$

These estimates for Z and W may readily be converted to the desired terms (i.e., the angle and range to source 102) via the relationships $R = 1/W$ and $\text{theta} = \text{ASIN}(Z)$. The terms of equations (3) are shown below in equations (4)-(9).

$$a = \Sigma m x^2 \quad (4)$$

$$b = \Sigma x^3 \quad (5)$$

$$c = \tfrac{1}{2} x^4 \quad (6)$$

$$d = \Sigma m x \quad (7)$$

$$e = \Sigma x^2 \quad (8)$$

$$f = \tfrac{1}{2} b \quad (9)$$

In accordance with some embodiments of the present invention, most of these terms (i.e., the terms that don't include phase measurement m) may be pre-computed because they are not dependent upon the measurements. In some embodiments, these pre-computed terms may be stored in a memory associated with signal processor 112 allowing for faster computations in real time, although the scope of the invention is not limited in this respect. In accordance with some embodiments of the present invention, signal processor 112 may use the estimates provided by equations (3) for the angle and the range to source 102 depending on the results of the proximity test.

In some embodiments, the proximity test may compare two hypotheses: one for a planewave assumption and the other for a curved wavefront assumption. The results from two equations may be compared using the estimate Z_est and W_est (i.e., which may already be computed) and a planewave angle or Z_est_plane, as described by the equations below.

$$S\_\text{curved} = (m_i - x_i Z\_\text{est} - \tfrac{1}{2} W\_\text{est} x_i^2 (1 - Z\_\text{est}^2))^2 \quad (10)$$

$$S\_\text{plane} = \Sigma(m_i - x_i Z\_\text{est\_plane})^2 \quad (11)$$

$$Z\_\text{est\_plane} = \Sigma m_i / \Sigma x_i \quad (12)$$

In equation (10), S_curved represents the sum of the MSEs of an angle and a range to source 102 based on the curved wavefront assumption. In equation (11), S_plane represents the sum of the MSEs of the angle to source 102 based on the planar wavefront assumption. Equation (12) is an estimate for calculating the Z_est_plane term used in equation (11).

Using the results of equations (10), (11) and (12), signal processor 112 may perform a proximity test determine which assumption may best fit the data. For example, in some embodiments, the proximity test compares the ratio of S_plane to S_curved with a threshold. When the ratio exceeds the threshold, the result of the proximity test may indicate that the curved wavefront assumption is better (i.e., a close range condition). When the ratio does not exceed the threshold, the result of the proximity test may indicate that the planar wavefront assumption is better (i.e., a far range condition).

Although some embodiments of the present invention are described with respect to an RF source, the scope of the invention is not limited in this respect. Some embodiments of the present invention are equally applicable to any wave source including, for example, optical sources, acoustic sources, sonar sources, and seismic-wave sources.

Figure 2:
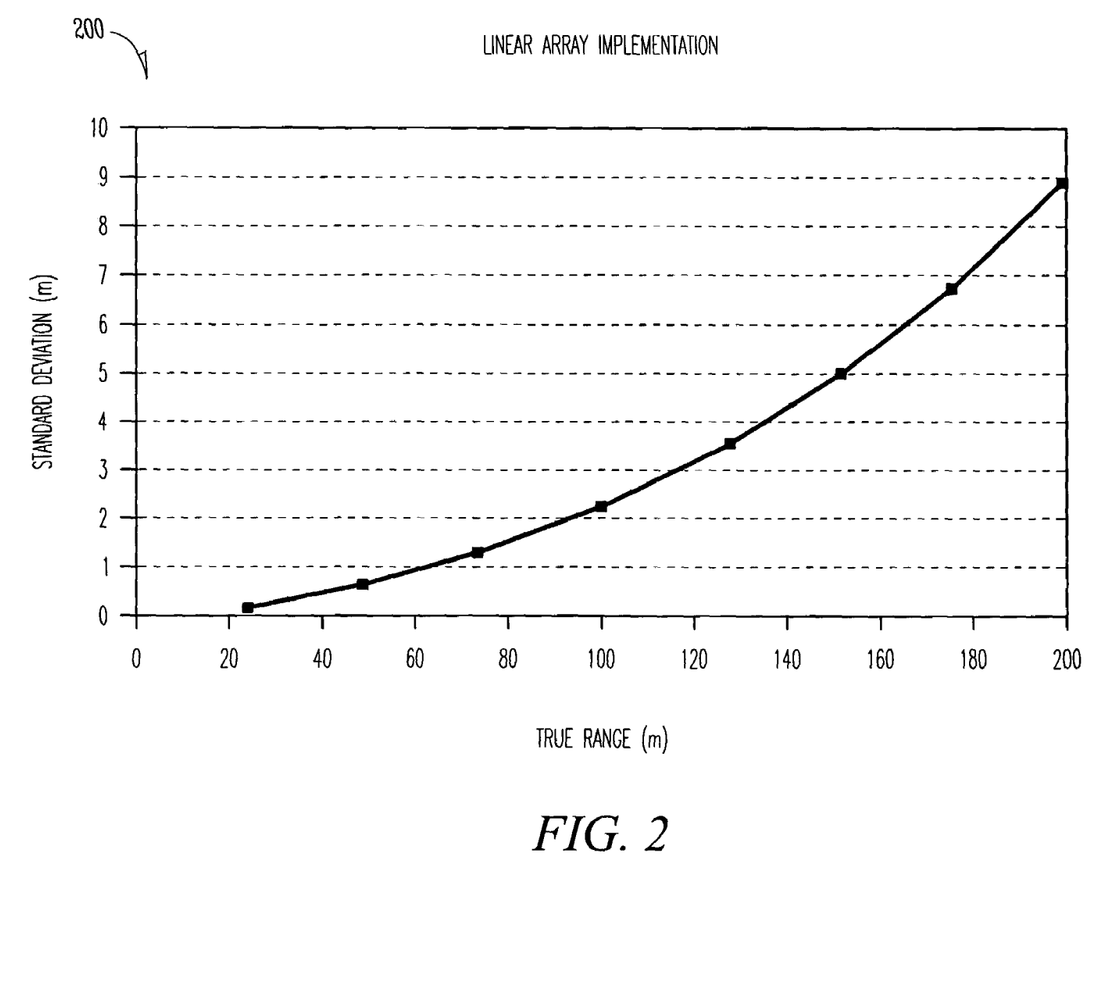
FIG. 2 shows an example of range estimation standard deviation in accordance with some embodiments of the present invention.

FIG. 2 shows an example of range estimation standard deviation in accordance with some embodiments of the present invention. Graph 200 illustrates the standard deviation on the y-axis and the true range on the x-axis for example embodiments in which front-end circuitry 110 comprises a Ka-band receiver and antenna 108 comprises sixteen array elements separated at ½ wavelengths. In this example embodiment, each of the sixteen array elements may be a sub-aperture and may be associated with one receiver channel. In these example embodiments, signal processing circuitry may use 1024 samples per antenna element. In these example embodiments, antenna 108 may have about a 60 dB sum beam signal-to-noise ratio, which provides about 48 dB gain per receiver channel. As can be seen by graph 200, a good estimation of the range may be calculated beyond the Fresnel region into the far-field of the antenna using the single set of signal samples used to perform the proximity test. In these example embodiments, the length of the aperture is about 6.4 centimeters (2.53 inches), although the scope of the invention is not limited in this respect.

Figure 3:
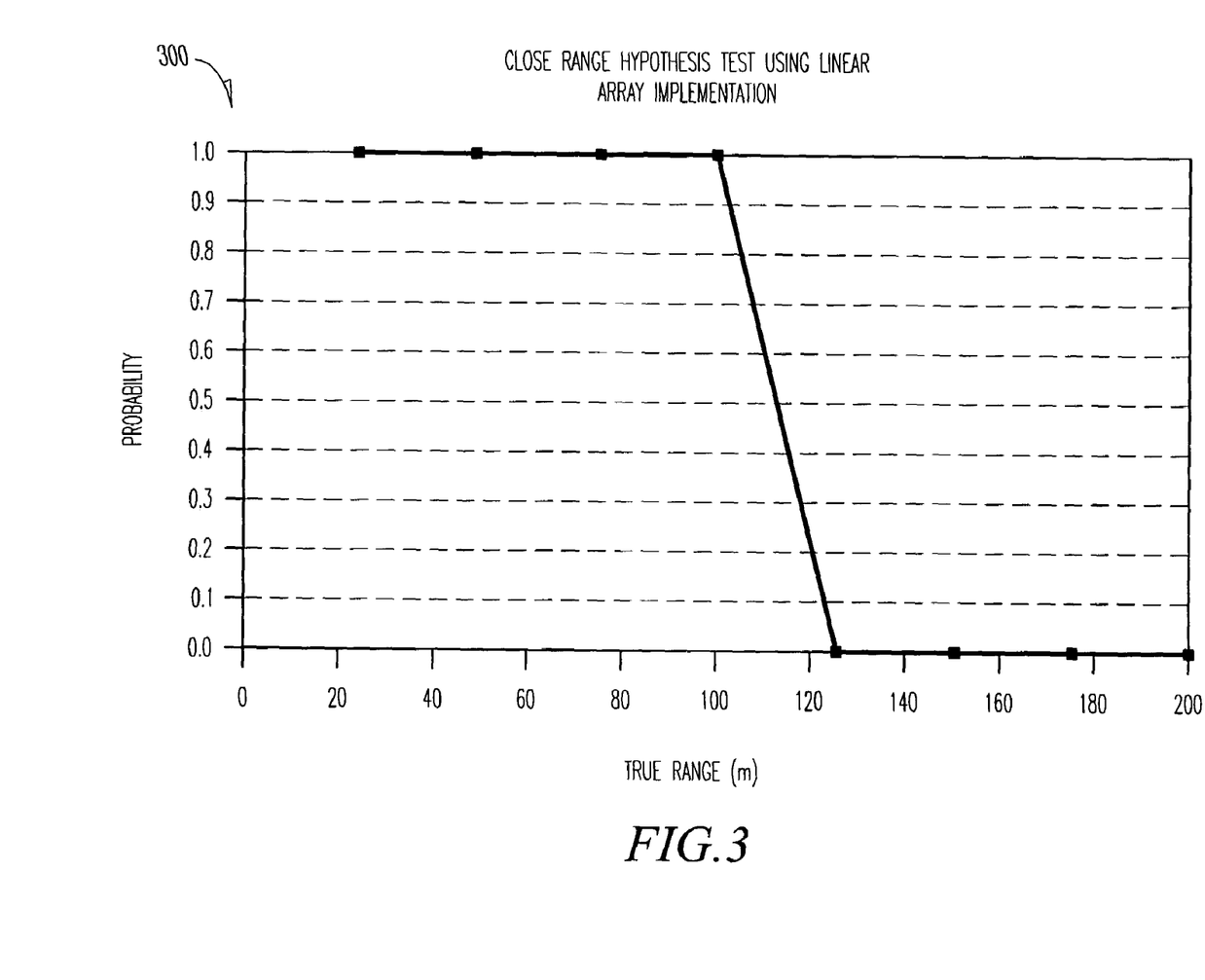
FIG. 3 illustrates a hypothesis test for a close-range hypothesis in accordance with some embodiments of the present invention.

FIG. 3 illustrates a hypothesis test for a close-range hypothesis in accordance with some embodiments of the present invention, under the conditions used to generate graph 200 (FIG. 2). Graph 300 illustrates the probability of determining the true range of a signal source, such as Source 102 (FIG. 1), for various ranges based on the use of the proximity test and the curved-wavefront hypothesis discussed above. In FIG. 3, an example threshold of 1.1 is used for the proximity test. As illustrated, the probability of determining the true range is 1.0 for close-in ranges between about 20 and 100 meters, even though some of these ranges may be in the far-field of antenna 108. The probability decreases quickly for further out ranges greater than 100 meters and becomes zero for ranges greater than about 125 meters. As can be seen, good range determining performance may be achieved for close-in ranges.

Figure 4:
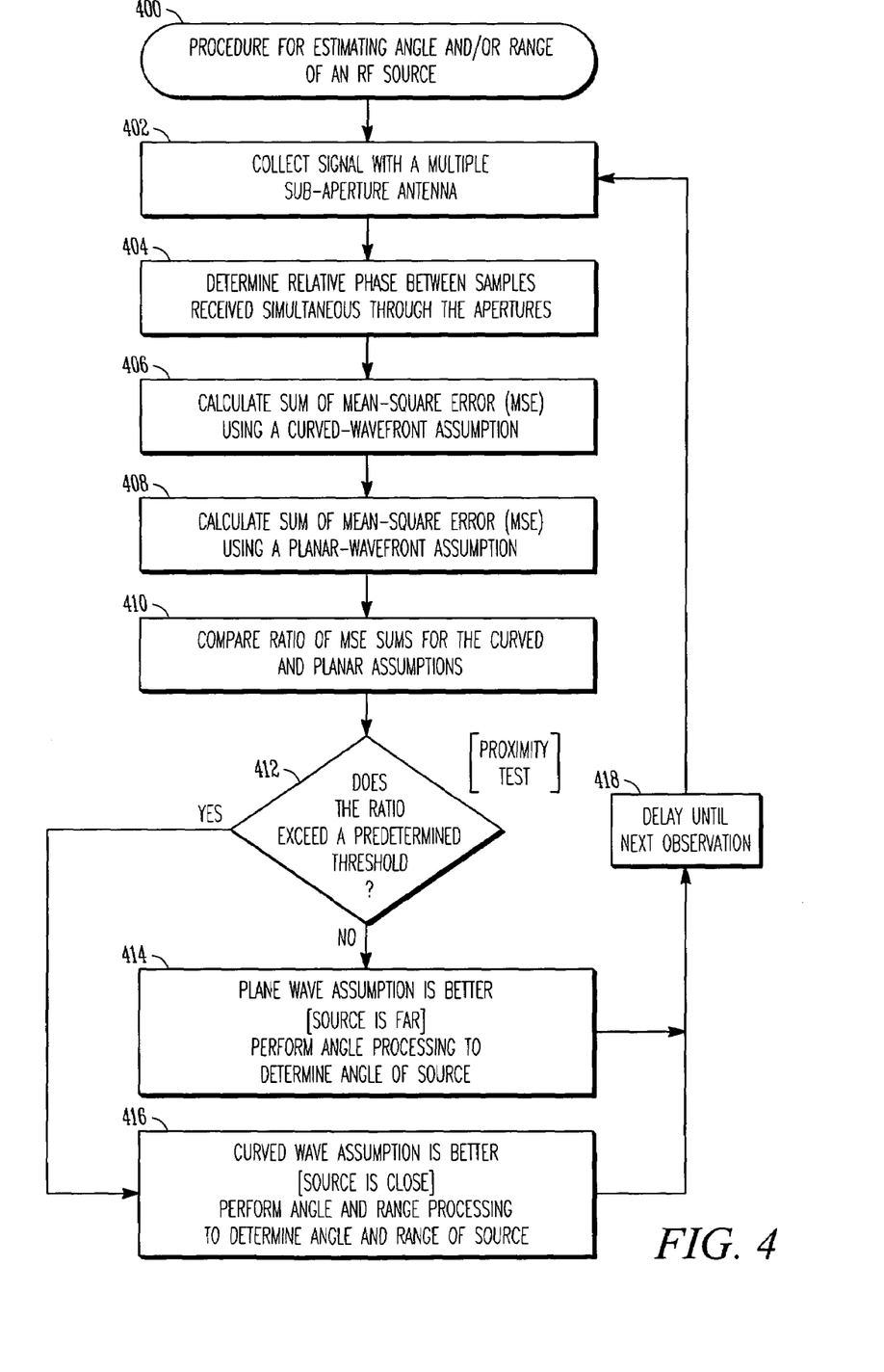
FIG. 4 is a flow chart of a procedure for estimating angle and range to an RF source in accordance with some embodiments of the present invention.

FIG. 4 is a flow chart of a procedure for estimating angle and range to an RF source in accordance with some embodiments of the present invention. Procedure 400 may be performed by a system such as angle and range estimating system 104 (FIG. 1) for determining angle and range to Source 102 (FIG. 1), although other systems and processing circuitry may also be used to perform procedure 400.

Operation 402 comprises collecting signals through three or more sub-apertures of an antenna, such as antenna 108 (FIG. 1). The signals from each sub-aperture may be processed in separate receiver channels to generate a plurality of samples, such as samples 111 (FIG. 1) for each sub-aperture. The samples may correspond to simultaneously received signals from a signal source, such as Source 102.

Operation 404 comprises determining the relative phase between the samples from each of the apertures. In some embodiments, operation 404 determines relative phase of the samples for each element 106 (FIG. 1) of antenna 108 (FIG. 1) from samples 111 (FIG. 1). These phase measurements may correspond to the measurement term $m_i$ in the above equations, in which "i" corresponds to the element number.

Operation 406 calculates the sum of the MSEs of the angle and range to the RF source using the phase measurements of operation 404 based on a curved wavefront assumption. In some embodiments, operation 406 may use equation (11) to calculate the sum of the MSEs for the curved wavefront assumption to determine S_curved.

Operation 408 calculates the sum of the MSEs of the angle to the RF source using the phase measurements of operation 404 based on a planar wavefront assumption. In some embodiments, operation 408 may use equations (12) and (13) to calculate the sum of the MSEs for the planar wavefront assumption to determine S_plane.

Operations 410 and 412 comprise the proximity test which tests whether or not the curved wavefront assumption is better or whether the planar wavefront assumption is better. Operation 410 comprises comparing the ratio of the sum of the MSEs for the curved wavefront assumption calculated in operation 406 with the sum of the MSEs for the planar wavefront assumption calculated in operation 408. Operation 412 comprises determining when the ratio exceeds a threshold. When operation 412 determines that the threshold is exceeded, operation 416 is performed. When operation 412 determines that the threshold is not exceeded, operation 414 is performed. The threshold may be determined based on a tradeoff between probability of detection and probability of false alarms, and may be selected on a case-by-case basis depending on the requirements of the particular system.

Operation 414 comprises performing angle processing to calculate the angle to the signal source. Operation 414 is performed when it is determined that the planar wavefront assumption is better and the source may be too far away to accurately determine the range using the current measurements. In some embodiments, operation 414 may perform angle processing similar to those used for mono-pulse angle measurements. In some embodiments, operation 414 may also comprise refraining from calculating a range estimate to the RF source using the simultaneously collected samples when the ratio does not exceed the predetermined value.

Operation 416 comprises performing angle and range processing to calculate both the angle and the range to the signal source. In some embodiments, operation 416 may use equation (3) above, although the scope of the invention is not limited in this respect. Operation 416 is performed when it is determined that the curved wavefront assumption is better. In some embodiments, operation 416 may use the same samples (i.e., generated from the simultaneous receipt of signals across the aperture) that were used in operation 404, although the scope of the invention is not limited in this respect.

Operation 418 comprises delaying further measurements until a next observation. The delay may allow the collection of additional samples and may be referred to as a dwell, before more data is processed, although the scope of the invention is not limited in this respect. The next observation may be based on the type of source, whether or not the source is being tracked and how fast the source is being tracked. In some embodiments, procedure 400 may be performed on a regular ongoing or substantially continual basis to track an RF source that may be moving. The angle and range outputs from operation 416, or the angle output from operation 414 may, for example, be displayed graphically for user and/or used for example, for target detection and/or target acquisition.

Although the individual operations of procedure 400 are illustrated and described as separate operations, one or more of the individual operations may be performed concurrently, and nothing requires that the operations be performed in the order illustrated. For example, operations 406 and 408 may be performed concurrently, although the scope of the invention is not limited in this respect.

Figure 5:
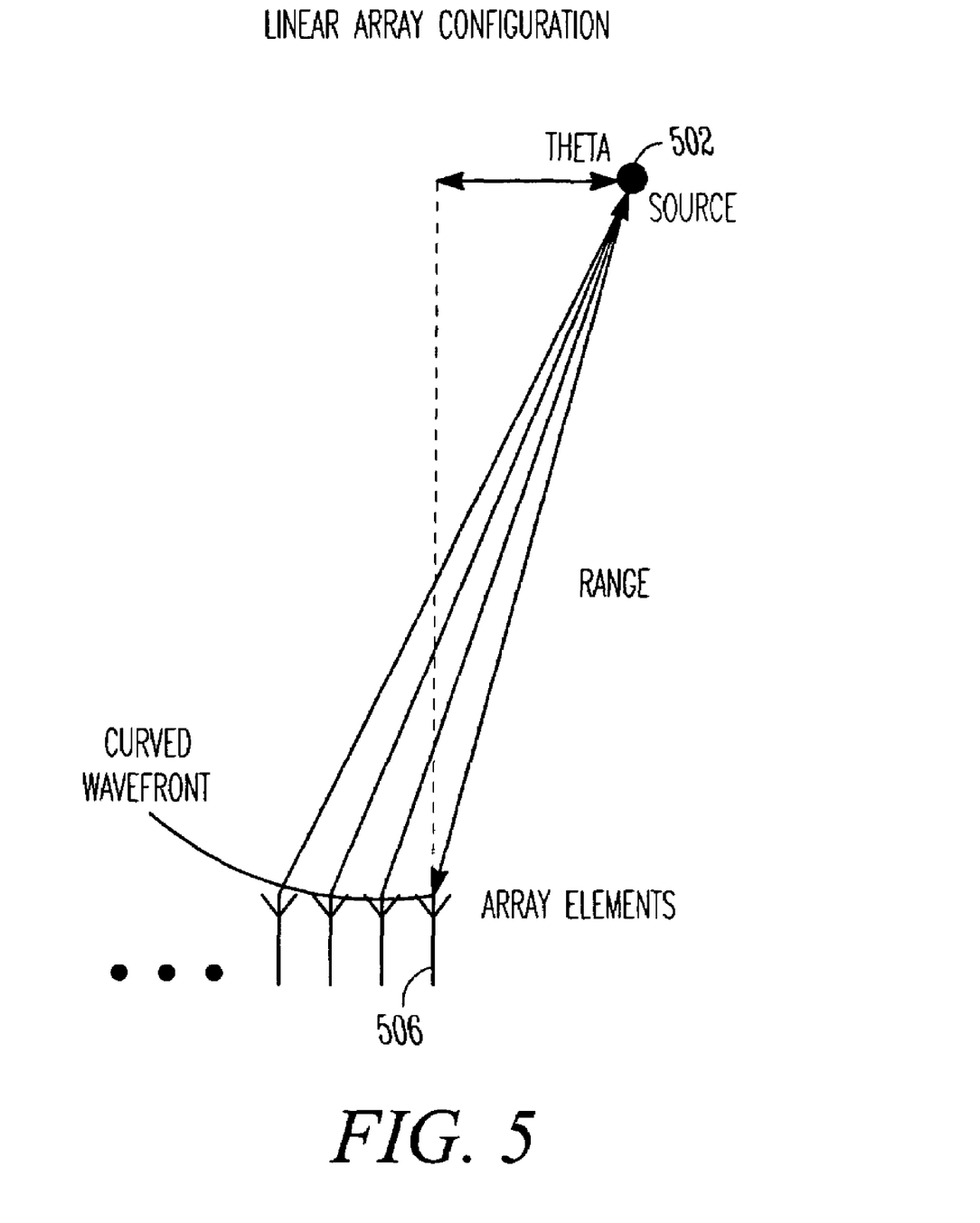
FIG. 5 illustrates angle determination using a linear array in accordance with some embodiments of the present invention.

FIG. 5 illustrates angle determination using a linear array in accordance with some embodiments of the present invention. In FIG. 5, source 502 may correspond to source 102 (FIG. 1) and array elements 506 may correspond to array elements 106 (FIG. 1). As illustrated in FIG. 5, as the angle (i.e., theta) to source 502 increases, the signal's projection on the array begins to decrease until at theta equals 90 degrees, the array is at an end-fire condition. In an end-fire condition, it may be difficult, if not impossible to determine range using a linear array. As described by equation (1), the Fresnel term containing the range term decreases to zero in an end-fire situation making range determination impossible with this equation. In some embodiments, discussed in more detail below, measurement of a second angle may be used to provide a more complete geometric determination of the angle to the source.

Figure 6:
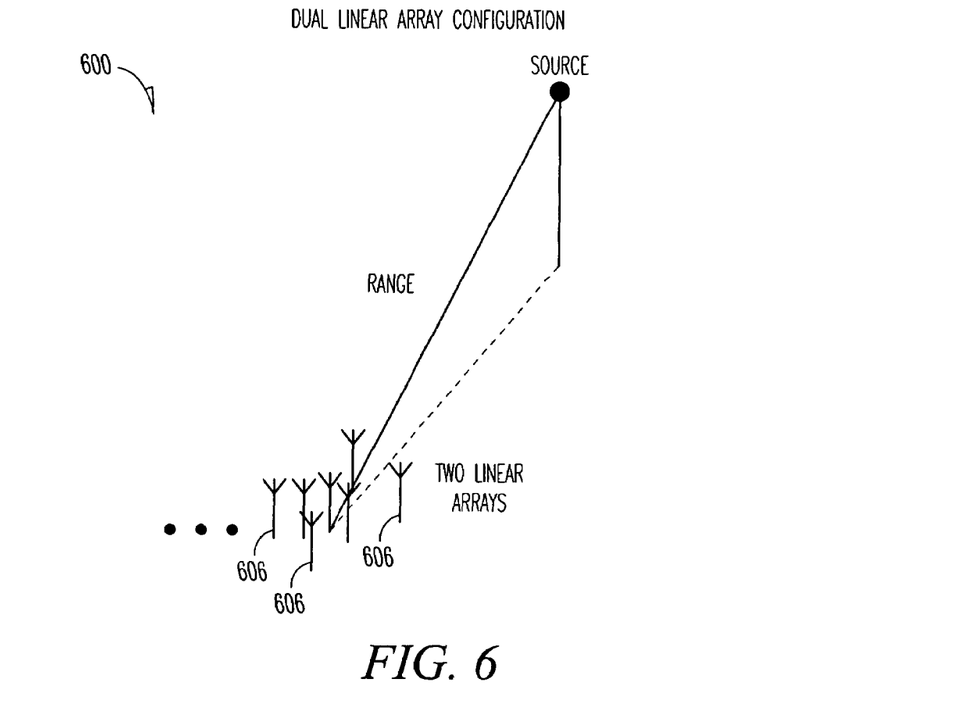
FIG. 6 illustrates angle determination using two linear arrays in accordance with some embodiments of the present invention.

In some embodiments, antenna 108 (FIG. 1) may include one or more additional arrays, each oriented differently. For example, in some embodiments, antenna 108 (FIG. 1) may include a second array of antenna elements 106 (FIG. 1) oriented at 90 degrees with respect to elements 106 (FIG. 1) of the first array. FIG. 6 illustrates angle determination using two linear arrays 600 in accordance with some embodiments of the present invention. As shown in FIG. 6, the use of two linear arrays of elements 606 may provide two angle estimates and two range estimates by applying the equations discussed above. In these embodiments, the range estimate from the array that is more broadside (i.e., smallest theta) to the array may be used, although the scope of the invention is not limited in this respect. For example, when the first array is oriented at or near 90 degrees (i.e., an end-fire condition) measurements from the second array may be used for range estimation. In some embodiments, measurements from each of the linear arrays may be used for range determination.

Figure 7:
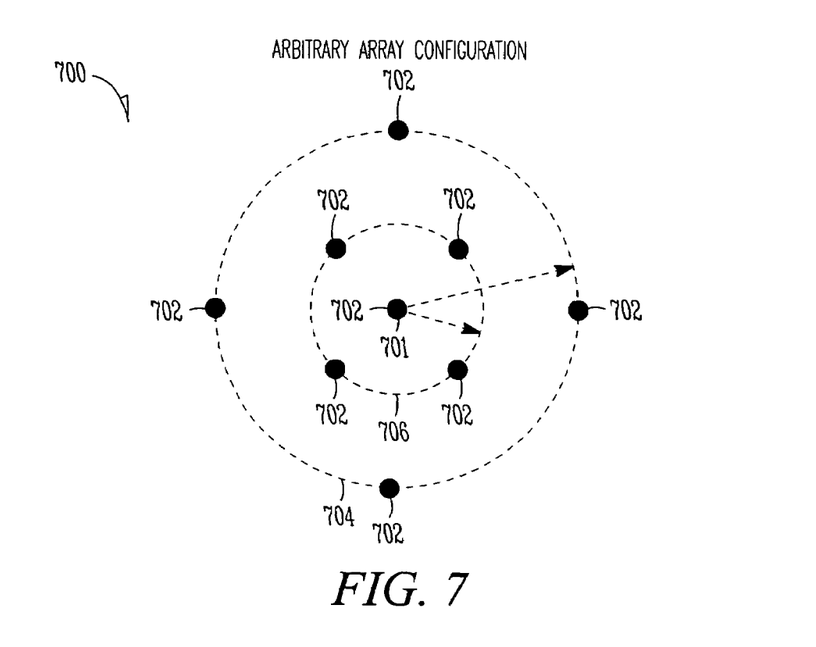
FIG. 7 illustrates a substantially arbitrary array of antenna elements in accordance with some embodiments of the present invention.

In some embodiments, the present invention may provide a complete systems solution to the passive ranging estimation problem for any geometric orientation relative to an aperture. In some embodiments, an arbitrary or non-linear array of elements may be used. FIG. 7 illustrates a substantially arbitrary array 700 of antenna elements 702 in accordance with some embodiments of the present invention. In these illustrated example embodiments, each sub-aperture has elements located on one of circumferential rings 704 or 706, centered around center 701, although the scope of the invention is not limited in this respect. In these arbitrary array element embodiments, a formulation for an arbitrary array configuration may use a generalization of the Fresnel approximation. In these embodiments, the locations of the array element locations may be within an x-y plane ($x_i$, $y_i$) of the antenna aperture, then the distance, $m_i$ for the ith array measurement, given the array location $P_i$ may be represented by the following equation.

$$m_i = \text{dot}(u, P_i) + \frac{1}{2} |u \times P_i|^2 / R \qquad (13)$$

In this equation, u is the unit vector to the source having unknown coordinates (A, B) at range R. Based on this, an equation similar to Equation #2 may be generated for almost any arbitrary array configuration.

$$S = \Sigma(m_i - (Ax_i + By_i) - \frac{1}{2}W(x_i^2 + y_i^2 - (Ax_i + By_i)^2))^2 \qquad (14)$$

Finding the solution to equation (14) may involve numeric methods. In some embodiments, simultaneous estimates A_est and B_est may be found first and then W_est may be found using equation (14), although the scope of the invention is not limited in this respect, as other methods may be used. In some embodiments, a LMS solution may be used to find the A_est and B_est values as a solution to equation (15) below. Examples of solutions are provided in equations (16) and (17).

$$S = \Sigma(m_i - (Ax_i + By_i))^2 \qquad (15)$$

$$A\_est = (\Sigma xy \Sigma my - \Sigma y^2 \Sigma mx)/(\Sigma y^2 \Sigma x^2 - (\Sigma xy)^2) \qquad (16)$$

$$B\_est = (\Sigma xy \Sigma mx - \Sigma x^2 \Sigma my)/(\Sigma y^2 \Sigma x^2 - (\Sigma xy)^2) \qquad (17)$$

The conversion to angles may be done using the relationship roll_est=atan2(B_est, A_est) and boresight_est=asin (sqrt(A_est$^2$+B_est$^2$)). Using the estimates of A and B from equation (14), the least mean-squared estimate of W may be provided by equation (18) below. The value $di^2$ may be defined as $x_i^2 + y_i^2$. Range may be estimated as R=1/W.

$$W\_est = 2[\Sigma m_i(di^2 - (A\_estx_i + B\_esty_i)^2) + \Sigma(A\_estx_i + B\_esty_i)(di^2 - (A\_estx_i + B\_esty_i)^2)]/(\Sigma(di^2 - (A\_estx_i + B\_esty_i)^2)^2) \qquad (18)$$

Figure 8:
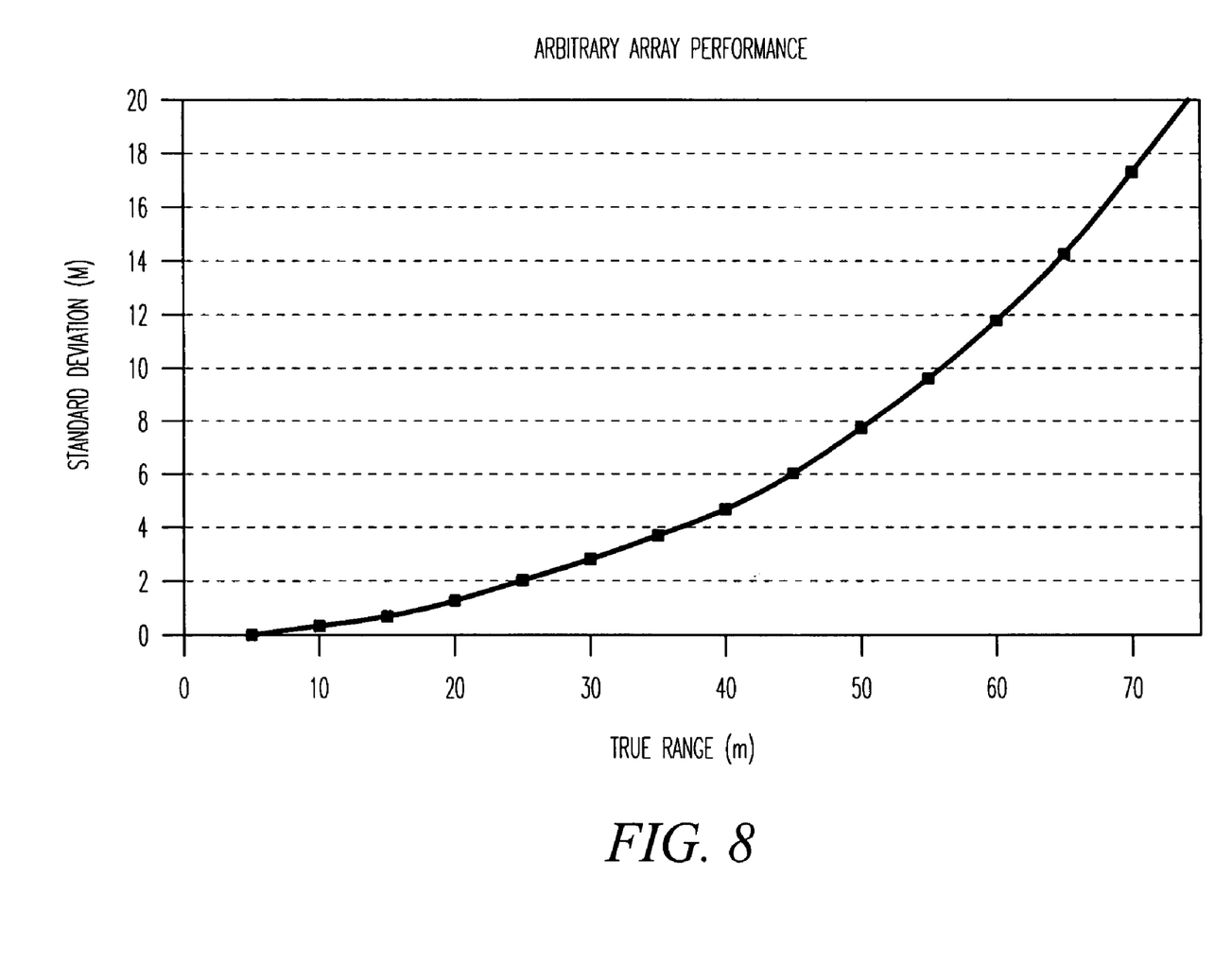
FIG. 8 shows an example of range estimation standard deviation for a substantially arbitrary array in accordance with some embodiments of the present invention.

FIG. 8 shows an example of range estimation standard deviation for an arbitrary array in accordance with some embodiments of the present invention. In FIG. 8, the range estimation standard deviation is illustrated for an example embodiment using a Ka-band receiver with nine antenna elements 702 illustrated in FIG. 7. In this example, the performance with one sample per element and 60 dB sum beam signal-to-noise ratio is illustrated. This example illustrates the ability of system 104 (FIG. 1) to estimate range with only one sample from each array element. As illustrated in FIG. 8, for the example array configuration of FIG. 7, the performance is very good at close range and begins to decay at ranges beyond 70 meters.

Thus, a system and method for passive angle and range estimation has been described that uses a single aperture antenna and a single sample from each sub-aperture. In some embodiments, the system and method may use computationally simple processing. In some embodiments, a complete system solution may be provided that may determine range based on a proximity threshold ratio. In some embodiments, the present invention may provide estimates for range beyond the Fresnel region into the "classic" far-field of the antenna, although the scope of the invention is not limited in this respect.

Referring back to FIG. 1, although system 104 (FIG. 1) is illustrated as having several separate functional elements, one or more of the functional elements may be combined and may be implemented by combinations of softwareconfigured elements, such as processing elements including digital signal processors (DSPs), and/or other hardware elements. For example, signal processor 112 (FIG. 1) may comprise one or more microprocessors, DSPs, application specific integrated circuits (ASICs), and combinations of various hardware and logic circuitry for performing at least the functions described herein.

Some embodiments of the present invention may be implemented in a combination of hardware, firmware and/or software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A system for passively estimating range and angle of a source comprising:
    an antenna to simultaneously receive signals from the source through a plurality of sub-apertures; and
    a signal processor to perform a proximity test using samples simultaneously collected from the sub-apertures to determine whether or not to calculate angle and range estimates to the source based on either a curved wavefront assumption or a planar wavefront assumption.

2. The system of claim 1 wherein the signal processor further calculates both the angle and range estimates to the source using the simultaneously collected samples when the ratio exceeds a predetermined threshold.

3. The system of claim 2 wherein the proximity test performed by the signal processor comprises:
    calculating a sum of mean-square-errors (MSEs) of the angle and range estimates to the source based on a curved wavefront equation using measured phases from each sub-aperture;
    calculating a sum of the MSEs of the angle and range estimates to the source based on a planar wavefront equation using the measured phases from each sub-aperture; and
    calculating a ratio of the sum of the MSEs calculated for the curved wavefront equation to the sum of the MSEs calculated for the planar wavefront equation.

4. The system of claim 3 wherein the signal processor calculates the angle and range estimates using a least-means-squared solution to a Fresnel approximation when the ratio exceeds a predetermined threshold.

5. The system of claim 2 wherein the signal processor measures a phase between initially collected samples of the simultaneously received signals generated from each of the sub-apertures.

6. The system of claim 2 wherein the signal processor calculates an angle estimate to the source when the ratio does not exceed the predetermined value using the simultaneously collected samples, and
    wherein the signal processor refrains from calculating a range estimate to the source using the simultaneously collected samples when the ratio does not exceed the predetermined value.

7. The system of claim 2 wherein the antenna has an aperture comprising at least three sub-apertures,
    wherein each sub-aperture comprises one or more array elements,
    wherein a spacing between the elements and a location of the elements are used by the signal processor to calculate both the angle and range estimates to the source.

8. The system of claim 7 wherein the array elements are arranged in a linear fashion across the aperture and comprise a linear array of elements.

9. The system of claim 7 wherein the array elements are arranged in a linear fashion in both x and y directions of a surface of the aperture and comprise at least two linear arrays of elements.

10. The system of claim 7 wherein the array elements are arranged in a substantially arbitrary fashion on a surface of the aperture, the locations of the array elements being used by the signal processor to calculate the angle and range estimates.

11. The system of claim 2 further comprising a front-end circuitry having a plurality of receiver channels, each receiver channel to provide the simultaneously collected samples from an associated one of the sub-apertures.

12. The system of claim 1 wherein the source is a radio-frequency source.

13. A method of passively estimating angle and range to a signal source comprising:
    simultaneously receiving signals from the source through a plurality of sub-apertures; and
    performing a proximity test using samples simultaneously collected from the sub-apertures to determine whether or not to calculate angle and range estimates to the source based on either a curved wavefront assumption or a planar wavefront assumption.

14. The method of claim 13 further comprising calculating both the angle and range estimates to the source using the simultaneously collected samples when the ratio exceeds a predetermined threshold.

15. The method of claim 14 wherein the proximity test comprises:
    calculating a sum of mean-square-errors (MSEs) of the angle and range estimates to the source based on a curved wavefront equation using measured phases from each sub-aperture;
    calculating a sum of the MSEs of the angle and range estimates to the source based on a planar wavefront equation using the measured phases from each sub-aperture; and
    calculating a ratio of the sum of the MSEs calculated for the curved wavefront equation to the sum of the MSEs calculated for the planar wavefront equation.

16. The method of claim 15 wherein calculating the angle and range estimates comprises calculating the angle and range estimates using a least-means-squared solution to a Fresnel approximation when the ratio exceeds a predetermined threshold.

17. The method of claim 14 further comprising measuring a phase between initially collected samples of the simultaneously received signals generated from each of the sub-apertures.

18. The method of claim 14 further comprising:
calculating an angle estimate to the source when the ratio does not exceed the predetermined value using the simultaneously collected samples; and
refraining from calculating a range estimate to the source using the simultaneously collected samples when the ratio does not exceed the predetermined value.

19. The method of claim 14 wherein the antenna has an aperture comprising at least three sub-apertures,
wherein each sub-aperture comprises one or more array elements,
wherein a spacing between the elements and a location of the elements are used to calculate both the angle and range estimates to the source.

20. The method of claim 19 wherein the array elements are arranged in a linear fashion across the aperture and comprise a linear array of elements.

21. The method of claim 19 wherein the array elements are arranged in a linear fashion in both x and y directions of a surface of the aperture and comprise at least two linear arrays of elements.

22. The method of claim 19 wherein the array elements are arranged in a substantially arbitrary fashion on a surface of the aperture, the locations of the array elements being used to calculate the angle and range estimates.

23. The method of claim 14 wherein receiving comprises receiving the simultaneously collected samples through plurality of receiver channels, each receiver channel to provide the simultaneously collected samples from an associated one of the sub-apertures.

24. The method of claim 13 wherein the source is a radio-frequency source.

25. A signal source locator comprising:
an antenna to simultaneously receive signals from the source through a plurality of sub-apertures; and
a signal processor to perform a proximity test using samples simultaneously collected from the sub-apertures to determine whether or not to calculate angle and range estimates to the source based on either a curved wavefront assumption or a planar wavefront assumption,
wherein the signal processor calculates both the angle and range estimates to the source using the simultaneously collected samples when the ratio exceeds a predetermined threshold, and
wherein the signal processor measures a phase between initially collected samples of the simultaneously received signals generated from each of the sub-apertures.

26. The signal source locator of claim 25 wherein the proximity test performed by the signal processor comprises:
calculating a sum of mean-square-errors (MSEs) of the angle and range estimates to the source based on a curved wavefront equation using measured phases from each sub-aperture;
calculating a sum of the MSEs of the angle and range estimates to the source based on a planar wavefront equation using the measured phases from each sub-aperture; and
calculating a ratio of the sum of the MSEs calculated for the curved wavefront equation to the sum of the MSEs calculated for the planar wavefront equation, and
wherein the signal processor calculates the angle and range estimates using a least-means-squared solution to a Fresnel approximation when the ratio exceeds a predetermined threshold.

27. The signal source locator of claim 26 wherein the signal processor calculates an angle estimate to the source when the ratio does not exceed the predetermined value using the simultaneously collected samples, and
wherein the signal processor refrains from calculating a range estimate to the source using the simultaneously collected samples when the ratio does not exceed the predetermined value.

28. The signal source locator of claim 25 wherein the source is a radio-frequency source.

29. A machine-accessible medium that provides instructions, which when accessed, cause a machine to perform operations comprising:
measuring a phase between initially collected samples of simultaneously received signals generated from each of a plurality of sub-apertures;
performing a proximity test using the initially collected samples of signals to determine whether or not to calculate angle and range estimates to the source based on either a curved wavefront assumption or a planar wavefront assumption; and
calculating both the angle and range estimates to the source using the simultaneously collected samples when the ratio exceeds a predetermined threshold.

30. The machine-accessible medium of claim 29 wherein the instructions, when further accessed cause the machine to perform operations,
wherein the proximity test comprises:
calculating a sum of mean-square-errors (MSEs) of the angle and range estimates to the source based on a curved wavefront equation using measured phases from each sub-aperture;
calculating a sum of the MSEs of the angle and range estimates to the source based on a planar wavefront equation using the measured phases from each sub-aperture; and
calculating a ratio of the sum of the MSEs calculated for the curved wavefront equation to the sum of the MSEs calculated for the planar wavefront equation,
wherein calculating the angle and range estimates comprises using a least-means-squared solution to a Fresnel approximation when the ratio exceeds a predetermined threshold.

31. The machine-accessible medium of claim 30 wherein the instructions, when further accessed cause the machine to perform operations comprising:
calculating an angle estimate to the source when the ratio does not exceed the predetermined value using the simultaneously collected samples; and
refraining from calculating a range estimate to the source using the simultaneously collected samples when the ratio does not exceed the predetermined value.

32. A system for passively estimating range and angle of a source comprising:
an antenna to receive signals from the source through a plurality of sub-apertures; and a signal processor to calculate angle and range estimates to the source based on a curved wavefront assumption using a simultaneously collected single set of samples, wherein the signal processor calculates the angle and range estimates using a least-means-squared solution to a Fresnel approximation, and wherein the antenna has an aperture comprising at least three sub-apertures, each sub-aperture comprising one or more array elements, wherein a spacing between the array elements and a location of the elements are used by the signal processor to calculate both the angle and range estimates to the source.

* * * * *

UNITED STATES PATENT AND TRADEMARK OFFICE
CERTIFICATE OF CORRECTION

PATENT NO. : 7,292,180 B2
APPLICATION NO. : 11/152291
DATED : November 6, 2007
INVENTOR(S) : Schober It is certified that error appears in the above-identified patent and that said Letters Patent is hereby corrected as shown below:

In column 4, line 26, delete "W_" and insert -- W_est --, therefor.

In column 4, line 26, after "(a-b*Z_est)/(c*" insert -- (3) --.

In column 4, line 27, delete "(1-Z_est $^2$)" and insert -- (1-Z_est$^2$) --, therefor.

In column 4, line 37, delete "c= ½x$^4$" and insert -- c=½∑x$^4$ --, therefor.

In column 4, line 64, delete "S_curved=" and insert -- S_curved=∑ --, therefor.

Signed and Sealed this

Twenty-fifth Day of March, 2008

JON W. DUDAS
*Director of the United States Patent and Trademark Office*